United States Patent [19]

Wingard

[11] 4,307,062

[45] Dec. 22, 1981

[54] PARTICULATE-CONTAINING FOAMED PLASTIC

[75] Inventor: Robert D. Wingard, Kent, Ohio

[73] Assignee: The Upjohn Company, Kalamazoo, Mich.

[21] Appl. No.: 175,150

[22] Filed: Aug. 4, 1980

Related U.S. Application Data

[63] Continuation of Ser. No. 961,059, Nov. 16, 1978, abandoned.

[51] Int. Cl.³ .................. B01F 15/02; B01F 15/04; B01J 14/00
[52] U.S. Cl. .................. 422/133; 264/DIG. 83; 366/159; 366/173; 366/177; 422/135; 425/4 R; 425/817 R
[58] Field of Search ............... 422/133, 135; 366/159, 366/173, 177; 264/DIG. 83, 57; 425/4 R, 817; 252/359 E

[56] References Cited

U.S. PATENT DOCUMENTS

| 3,220,801 | 11/1965 | Rill, Jr. et al. | 422/133 |
| 3,232,709 | 2/1966 | Cole | 422/133 |
| 3,353,918 | 11/1967 | Perrin | 422/133 |
| 3,617,029 | 11/1971 | Breer | 422/133 |
| 3,788,337 | 1/1974 | Breer | 422/133 |
| 3,857,550 | 12/1974 | Knipp | 422/133 |
| 3,964,731 | 6/1976 | Ernst | 366/159 |
| 4,082,512 | 4/1978 | Wingard et al. | 422/240 |
| 4,099,919 | 7/1978 | Leidal | 366/173 |
| 4,106,115 | 8/1978 | Takahashi et al. | 366/159 |

Primary Examiner—Michael S. Marcus
Attorney, Agent, or Firm—St. Onge, Steward, Johnston, Reens & Noe

[57] ABSTRACT

A method and apparatus for incorporating particulate material in reactive resin mixes produced by the RIM method in the molding of foamed or unfoamed plastic articles, wherein the particulate material is introduced into the resin mix in a manner which substantially eliminates the severe abrasive effect such particulate material produces under conditions existing in prior methods due to flow through the various passages of the mixing head. The particulate material may constitute reinforcement for a plastic article, in which case short lengths of glass, carbon, graphite or other mineral or metal fibers and the like may be used. Alternatively, granular particulates such as carbon black, metal or mineral oxides, pigments, etc. may be incorporated for coloring the product, or increasing its resistance to actinic rays, or for imparting increased rigidity to the molded product, etc.

3 Claims, 2 Drawing Figures

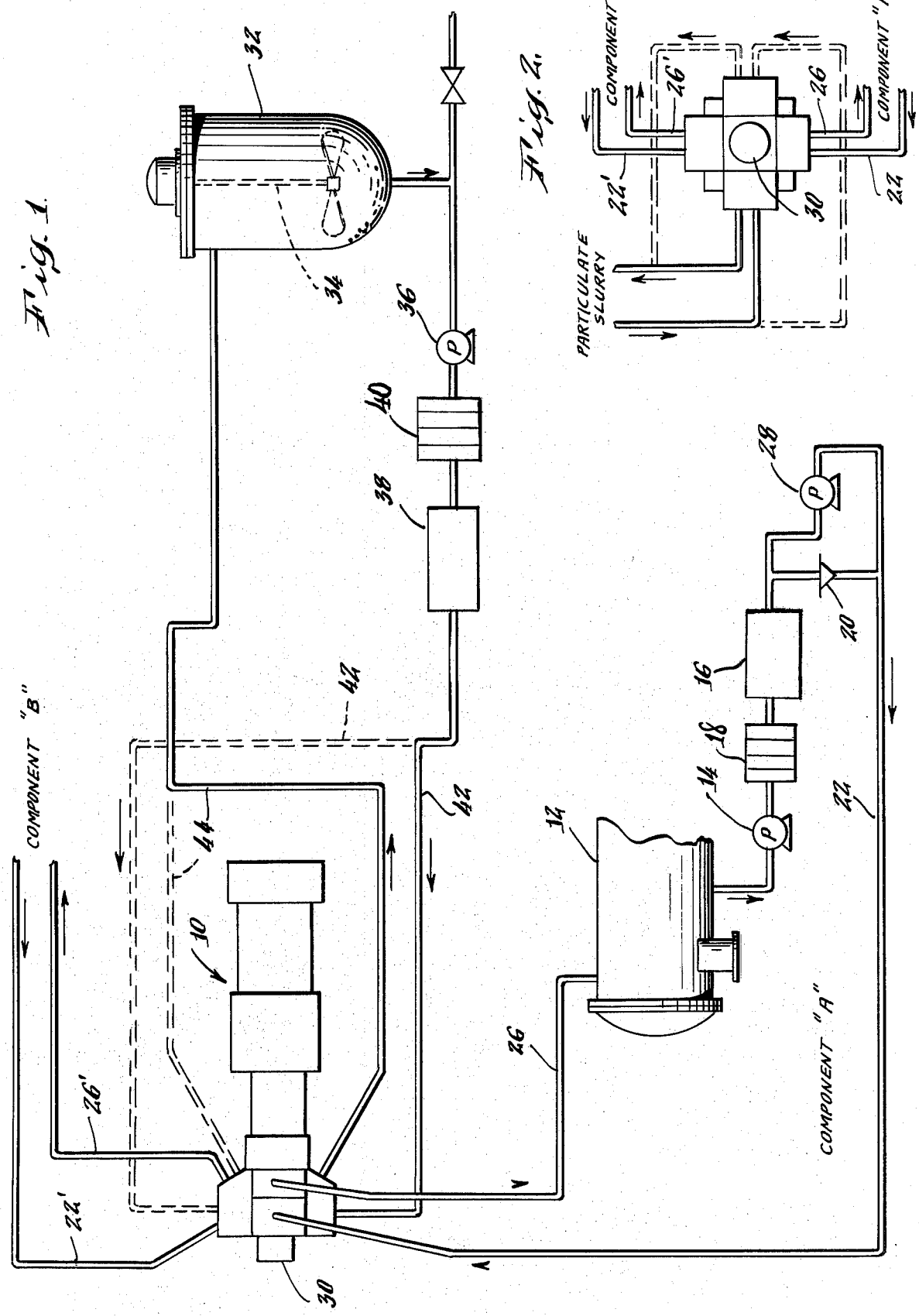

PARTICULATE-CONTAINING FOAMED PLASTIC

This is a continuation of application Ser. No. 961,059, filed Nov. 16, 1978, now abandoned.

BACKGROUND OF THE INVENTION

1. Field of the Invention

This invention relates to improvements in the art of reaction injection molding (RIM) of reactive liquid resin mixes in the production of foamed or unfoamed plastic products, and more especially the incorporation into such plastic products of a variety of particulates, either fibrous, granular, or the like, which serve as reinforcement of the finished product to meet requirements of greater strength, better insulative or lower expansion properties, or which serve other functions such as coloring, fire retarding, etc.

2. Brief Description of the Prior Art

In the typical RIM system of producing plastic products, two or more liquid polymer precursors of a reactive mix are individually stored in large tanks and are separately pumped to a mixing head where they are injected under high pressure through orifices in the head to produce impinging streams within a mixing chamber of the head. Admission of the components to the mixing chamber is controlled by a plunger which reciprocates between an extended position in which the plunger fills the mixing chamber and blocks admission of the components through the injection ports or orifices, and a retracted position in which the plunger is withdrawn from the mixing chamber to allow admission of the components through their respective orifices. This admission occurs in the form of high velocity streams as mentioned above and which impinge within the mixing chamber to effect intimate mixing and polymerizing reaction. The mixed components in the chamber are then expelled into a suitable mold through a discharge port of the mixing head on return of the plunger to its original position. Such return simultaneously shuts off further admission of components to the mixing chamber and diverts the individual components back to their respective storage tanks through respective recycle conduits. A typical RIM mixing head is disclosed in U.S. Pat. No. 4,082,512 to which reference is made for further details of a known arrangement.

Examples of resin compositions utilized in RIM production include various polymerizable materials; e.g., polyurethane, polyester, epoxy, phenol-aldehyde and urea-aldehyde resins, obtainable by commercially known methods of manufacture. For example, polyurethane resins are commonly prepared by polymerizing polyols and polyisocyanates in combination with various catalyzing, foaming, plasticizing, etc., ingredients. Reference is made to U.S. Pat. Nos. 4,055,548 and 4,112,014 for typical examples of various compositions useful in the process. There is an enormous number of available resin compositions which can be used, the selection being dependent upon ultimate desired chemical and physical characteristics of the foamed product.

For purposes of discussion here, the term resin composition is used in a generic sense to mean polymerizable plastic mixes, whether of foamed or unfoamed type. The term is not here used to designate only one component (i.e. polyol), as it is sometimes employed by production personnel.

It has been proposed heretofore to incorporate various particulate materials into reactive liquid plastic mixes produced by RIM techniques in order to modify the physical properties of the articles molded of such plastic mixes. The particulate additions mentioned include glass fiber for the purpose of increasing the strength of the molded product, and also to better match the coefficient of expansion of the molded product to that of a base (e.g. metal) part with which it may be associated. Specific examples of the latter are found in foamed and unfoamed plastic automobile parts. Reaction injection molding of plastic is often a particularly satisfactory method of production, owing to the fact that such system enables viscous, fast-setting, mixes to be utilized, producing consequent increase in production rates and better physical properties. The incorporation of particulate matter in such mixes, however, causes problems. A typical method of producing fiber reinforced plastic products is disclosed, for example, in U.S. Pat. No. 4,073,840. According to that patent, a slurry is formed of glass fibers and one or more of the resin components. The slurry is agitated to maintain the fiber in suspension, and the slurry is then pumped to a mixing head where it is mixed with the complementary resin components incorporating blowing and/or curing agents, etc., required in producing the moldable resin mix. Temperature and viscosity of the components have a large effect on the curing time and the ultimate physical properties of the product. For this reason, the components are continuously recirculated in unmixed condition between their respective storage reservoirs and the mixing head, in order to continually pass them through heat exchangers and thereby maintain optimum temperature conditions. In this way the development, between molding "shots", of off-temperature increments of the several components in the passages in and adjacent to the mixing head is minimized.

The incorporation of fiber or other particulate matter in a resin component as proposed in the foregoing patent involves incorporating the particulate directly in the main supply of one of the components. The system is accordingly subject to the disadvantage, in case it is desired to change the resin mix formulation, of having to remove all trace of the previous particulate-carrying component from the storage tank, feed and return lines, etc. Another and even more troublesome disadvantage of the prior system arises because of abrasive action of the fiber-bearing component, under the high RIM operating pressures involved, upon passing through the internal passages of the mixing head. At the usual component operating pressures of up to 2600 psi used in RIM production, this abrasion becomes excessive, especially as the percent of fiber incorporated is raised to the levels frequently desired. The usual RIM mixing head employs a control plunger which is very carefully machined to extremely close tolerances to provide a lapped, leak-proof, sliding fit in a similarly carefully machined cylinder defining the mixing chamber. The plunger also includes axial recirculation grooves to allow for return (in separate, unmixed condition) of the components during non-molding cycles of operation. The plunger and its grooves are therefore particularly susceptible to abrasive action of particulate matter in the liquid components to be mixed, and expensive maintenance and repair are encountered. The prior art has nevertheless put up with these problems in order to meet demand for molded resin products having the improved properties which such particulate incorporation provides.

SUMMARY OF THE INVENTION

According to the invention, a method and apparatus are provided which permit incorporation of particulate material as reinforcing, coloring, etc. in reactive resin compositions produced by the RIM method, but without encountering the disadvantages spoken of above. In brief the invention involves incorporating a particulate material in a separate or auxiliary portion of one or more of the reactive liquid components to produce a slurry therewith. This slurry is pumped separately, at a low pressure which is only a small fraction of the normal RIM operating pressure, to a mixing head orifice and plunger recirculation groove separate from those used for the primary (non-particulate-containing) resin components. It is surprising to find that although the pressure of the auxiliary, slurried, resin component is very low compared to that of the main components, injection of the low pressure fluid and mixing thereof with the primary components can and does nevertheless effectively occur in the mixing chamber. Because of the lower pressure operating conditions obtaining in the particulate slurry, a substantial reduction in abraiding effect by the particulate on the passages of the system is realized, and significant reduction of mixing head maintenance and prolonged operating life of the mixing head are achieved.

Additional objects and advantages of the invention include the simplification of converting from one type of particulate material to another, without altering or affecting the primary component storage systems. Other objects and advantages of the invention will be set forth in or apparent from the following detailed description of the system described below in connection with the accompanying drawing.

BRIEF DESCRIPTION OF THE DRAWINGS

FIG. 1 is a schematic flow diagram of a RIM system incorporating the present invention for introduction of particulate material into a foamed plastic mix prior to molding; and FIG. 2 is a schematic end view of the RIM head in the system of FIG. 1.

DETAILED DESCRIPTION OF THE PREFERRED EMBODIMENT

Referring to FIG. 1 of the accompanying drawing, a two-component RIM system for production of a polyurethane foam, for example, is schematically illustrated. In the illustrated system, a RIM mixing head 10 is supplied with two primary components, component A and component B, one of which consists of the isocyanate, and the other contains the polyol and further incorporates the catalyst, blowing agent, etc. The component circulation systems are identical and consequently only that for component A is illustrated for simplification of description.

A storage tank 12 contains the supply of primary component A which is pumped by a low pressure pump 14 through a heat exchanger 16 where heat is added to or subtracted from the liquid to maintain a desired operating condition. In addition, component A is also passed through a strainer 18, usually located between the pump and exchanger. Component A then passes through a check valve 20 to feed duct 22 and to an injection port (not shown) in mixing head 10.

In the non-mix condition of operation, the control plunger (not shown) in the mixing head is positioned in its fully extended position in the mixing chamber, thus filling the chamber and blocking entry of both components to the chamber. Each component is thus pumped at low pressure to flow along its respective axial groove of the plunger and is delivered by return duct back to its storage tank. Duct 26 is the return duct for component A. This low pressure flow insures the availability directly at the mixing chamber of mixing head 10 of components which are at proper temperature whenever a mixing and molding cycle of the mixing head is initiated. Upon initiation of such a cycle, the plunger of the mixing head is moved to its retracted position in which it no longer blocks the injection orifices opening into the mixing head. At the same time, a high pressure pump 28 is activated so that component A is then subjected to the usual RIM operating pressures. Check or relief valve 20 prevents reverse flow to the low pressure side. Simultaneously a high pressure pump in component B system is actuated. These pumps meter the respective components, causing them to be forced through the mixing head orifices and producing high velocity streams in the open mixing chamber of the head. In the condition described, streams of components A and B impinge under high velocity within the mixing chamber of the head and produce the desired intimate mixing and reaction of the components to form the resin mix. The mixing/molding "shot" is timed by suitable apparatus to provide the desired volume of foamable mixture in the mixing chamber, at the conclusion of which the high pressure pumps are shutdown. Simulanteously the mixing head plunger is moved back to its extended position, purging the chamber of mix and blocking further entry of the components. The resin mix is expelled through discharge nozzle 30 into a suitable mold (not shown) where it is formed and polymerized into a resin product of desired shape. So much of the system is standard.

As explained above, attempt has been made heretofore to incorporate fibers or particulate matter into one or both of the primary components in order to achieve improved properties in the finished resin product. Although severe erosion and abrasion of the carefully machined plunger, recirculation grooves and mixing chamber of the mixing head, as well as the pumps and ducts of the several component systems, has presented a serious problem, no other solution has appeared.

The present invention is based on the discovery that erosion problems of the prior systems can be overcome in a relatively simple manner, with minimum change in existing equipment. Again referring to FIG. 1, the arrangement incorporating the invention involves the normal systems for each of the primary components A and B, but further incorporates a separate, auxiliary component system. This auxiliary system consists of a storage tank 32 within which a portion of one of the primary components, preferably the high output component, is admixed with the particulate material, e.g. fiber glass, to be introduced. An agitator 34 is employed in the tank to maintain a uniform slurry. This is then pumped by low pressure pump 36 through a standard heat exchanger, 38 after passing through a strainer 40 (similar to that for components A and B) and then to feed ducts 42. Ducts 42 lead to ports constituting auxiliary injection orifice(s) of mixing head 10 separate from the high pressure (RIM) injection orifices for components A and B. These auxiliary ports are uncovered upon retraction of the mixing head plunger simultaneously with uncovering of the high pressure injection ports for the primary components. Thus the particulate-containing slurry is injected into the mixing chamber directly in the presence of the high velocity impinging streams of the primary components. Contrary to what was expected by those experienced in RIM technology, only a very low pressure need be applied to the particulate-bearing slurry to cause it to enter into the mixing chamber. In practice it is found that a pressures on the order of as low as 40 and up to 200 psi are satisfactory for a polyol-fiberglass slurry having viscosities of 20,000 to 50,000 centipoises, while an operating pressure of about 2600 psi is maintained for each of the primary components A and B. Even though the pressure of the primary components is vastly in excess of that of the slurry, it appears that the pressure drop occurring upon entry of the primary components into the chamber is sufficiently rapid to permit introduction of the particulate-bearing slurry at the low pressure level indicated. Still more surprising is that introduction of the slurry at the low pressure nevertheless effects an intimate mixing of the particulate throughout the whole resulting resin mix by the time it is expelled by the mixing head plunger into a mold.

The auxiliary particulate-bearing system includes a return duct 44 leading from the mixing head to the tank 32, so that the slurry is constantly recirculated during non-mix, non-molding periods of operation, in the same manner as the primary components. As illustrated in FIG. 1, both the feed and return ducts 42, 44 are preferably branched to provide introduction of the slurry at two diametrically opposed points in the mixing chamber of the mixing head. The arrangement is further illustrated in FIG. 2 of the accompanying drawings.

In practice, up to 25% by weight of fiber glass, for example, based on the total mix weight has been successfully incorporated in a urethane mix of the type described in the patent referred to above. The fiber consisted of random chopped lengths up to one-quarter inch in length. For simplicity of handling, it is preferred to slurry the fiber in a separate portion of polyol component. Such component may be of the same or different composition from that of the primary polyol component. Similarly, other particulate inclusions such as finely ground coloring pigments, mineral oxides and the like may be incorporated up to 50% of the weight of the mix.

What is claimed is:
1. In reaction injection mixing and molding apparatus for incorporating particulate material with two or more primary liquid resin components capable of reacting to produce a plastic mix moldable to form a plastic article in which said particulate material is uniformly dispersed, the combination which comprises:
a mixing head of the type producing reaction injection mixing and having a mixing chamber with a first set of ports opening into said chamber in streamwise intersecting arrangement;
separate storage means for respective sources of primary liquid components;
duct and high pressure pump means respectively connecting said separate primary liquid storage means to said first set of ports in said mixing head for introducing said primary components into the mixing chamber of said head as impinging streams;
auxiliary storage means including mechanical mixing means incorporated therein for a liquid component having a particulate matter incorporated therein;
auxiliary ports means in said mixing head also opening into said mixing chamber, and auxiliary duct means and an auxiliary pump connecting said auxiliary ports means for delivery of said particulate-containing liquid component thereto;
said mixing head having plunger means located in said mixing chamber operable to uncover said auxiliary port means along with the uncovering of said first set of injection ports to allow all of said liquid components to enter said mixing chamber together;
said high pressure pump means including means for maintaining said primary liquid componentspressure at normal RIM operating pressure, while said auxiliary pump means including means for maintaining a maximum pressure of said particulate-containing auxiliary component substantially below said normal RIM operating pressure during a pour cycle of said mixing head.
2. Apparatus as defined in claim 1, wherein said duct means feeding said primary components to said mixing head are connected to diametrically, oppositely disposed ports of said first set in said mixing head.
3. Apparatus as defined in claim 1, wherein said mixing head includes two oppositely disposed auxiliary ports in said mixing chamber, and said auxiliary duct means feeds said particulate-containing component to each of said auxiliary ports.

* * * * *

UNITED STATES PATENT OFFICE
CERTIFICATE OF CORRECTION

Patent No. 4,307,062  Dated December 22, 1981

Inventor(s) Robert D. Wingard

It is certified that error appears in the above-identified patent and that said Letters Patent are hereby corrected as shown below:

Column 6, Claim 1, line 22 and line 25 "ports" should read --port--; line 31 "together;" should read --together; and--; lines 33 and 34 "componentspressure" should read --component pressure--; line 34"pressure, while" should read --pressure, and--.

Signed and Sealed this

Twenty-fifth Day of May 1982

[SEAL]

Attest:

Attesting Officer

GERALD J. MOSSINGHOFF

Commissioner of Patents and Trademarks